US009759983B2

(12) United States Patent
Fermann et al.

(10) Patent No.: US 9,759,983 B2
(45) Date of Patent: Sep. 12, 2017

(54) FREQUENCY COMB SOURCE WITH LARGE COMB SPACING

(71) Applicant: IMRA AMERICA, INC., Ann Arbor, MI (US)

(72) Inventors: Martin Fermann, Dexter, MI (US); Ingmar Hartl, Hamburg (DE)

(73) Assignee: IMRA AMERICA, INC., Ann Arbor, MI (US)

( * ) Notice: Subject to any disclaimer, the term of this patent is extended or adjusted under 35 U.S.C. 154(b) by 0 days.

(21) Appl. No.: 14/967,709

(22) Filed: Dec. 14, 2015

(65) Prior Publication Data
US 2016/0097963 A1 Apr. 7, 2016

Related U.S. Application Data

(62) Division of application No. 14/035,244, filed on Sep. 24, 2013, now Pat. No. 9,252,561, which is a division
(Continued)

(51) Int. Cl.
*G02F 1/00* (2006.01)
*G02F 1/365* (2006.01)
(Continued)

(52) U.S. Cl.
CPC .............. *G02F 1/365* (2013.01); *G01J 3/10* (2013.01); *H01S 3/0085* (2013.01);
(Continued)

(58) Field of Classification Search
CPC .... H01S 3/0085; H01S 3/0092; H01S 3/1106; G02F 1/365; G02F 2001/3528
See application file for complete search history.

(56) References Cited

U.S. PATENT DOCUMENTS 4,191,473 A 3/1980 Haensch
4,451,923 A 5/1984 Haensch
(Continued)

FOREIGN PATENT DOCUMENTS

CN 102576971 A 7/2012
JP 08222791 A 8/1996
(Continued)

OTHER PUBLICATIONS

A. Bartels et al., Femtosecond-laser-based synthesis of ultrastable microwave signals from optical frequency references, Optics Letters, vol. 30, Issue 6, pp. 667-669 (2005).
(Continued)

*Primary Examiner* — Armando Rodriguez
(74) *Attorney, Agent, or Firm* — Sughrue Mion, PLLC; Richard C. Turner

(57) ABSTRACT

A frequency comb laser providing large comb spacing is disclosed. At least one embodiment includes a mode locked waveguide laser system. The mode locked waveguide laser includes a laser cavity having a waveguide, and a dispersion control unit (DCU) in the cavity. The DCU imparts an angular dispersion, group-velocity dispersion (GVD) and a spatial chirp to a beam propagating in the cavity. The DCU is capable of producing net GVD in a range from a positive value to a negative value. In some embodiments a tunable fiber frequency comb system configured as an optical frequency synthesizer is provided. In at least one embodiment a low phase noise micro-wave source may be implemented with a fiber comb laser having a comb spacing greater than about 1 GHz. The laser system is suitable for mass-producible fiber comb sources with large comb spacing and low noise. Applications include high-resolution spectroscopy.

9 Claims, 8 Drawing Sheets

Related U.S. Application Data of application No. 12/955,759, filed on Nov. 29, 2010, now Pat. No. 8,571,075.

(51) Int. Cl.

| | | |
|---|---|---|
| *H01S 3/11* | (2006.01) | |
| *G01J 3/10* | (2006.01) | |
| *H01S 3/067* | (2006.01) | |
| *H01S 3/00* | (2006.01) | |
| *H01S 3/08* | (2006.01) | |
| *H01S 3/10* | (2006.01) | |
| *H01S 3/105* | (2006.01) | |
| *H01S 3/16* | (2006.01) | |
| *G02F 1/35* | (2006.01) | |

(52) U.S. Cl.
CPC .......... *H01S 3/0092* (2013.01); *H01S 3/0675* (2013.01); *H01S 3/1106* (2013.01); *H01S 3/1112* (2013.01); *H01S 3/1115* (2013.01); *G02F 2001/3528* (2013.01); *H01S 3/0809* (2013.01); *H01S 3/08054* (2013.01); *H01S 3/105* (2013.01); *H01S 3/10046* (2013.01); *H01S 3/1118* (2013.01); *H01S 3/1618* (2013.01)

(56) References Cited

U.S. PATENT DOCUMENTS

| | | | |
|---|---|---|---|
| 4,700,150 | A | 10/1987 | Hall |
| 5,079,444 | A | 1/1992 | Kallenbach |
| 5,450,427 | A | 9/1995 | Fermann |
| 5,479,422 | A | 12/1995 | Fermann |
| 5,723,856 | A | 3/1998 | Yao |
| 6,038,055 | A | 3/2000 | Haensch |
| 6,301,048 | B1 | 10/2001 | Cao |
| 6,567,436 | B1 | 5/2003 | Yao |
| 6,724,788 | B1 | 4/2004 | Holzwarth |
| 6,785,303 | B1 | 8/2004 | Holzwarth |
| 6,885,683 | B1 | 4/2005 | Fermann |
| 6,897,959 | B2 | 5/2005 | Haensch |
| 6,956,887 | B2 | 10/2005 | Jiang |
| 7,012,696 | B2 | 3/2006 | Orr |
| 7,026,594 | B2 | 4/2006 | Holzwarth |
| 7,190,705 | B2 | 3/2007 | Fermann |
| 7,233,607 | B2 | 6/2007 | Richardon et al. |
| 7,418,017 | B2 | 8/2008 | Holzwarth |
| 7,593,644 | B2 | 9/2009 | Kaertner |
| 7,602,825 | B1 | 10/2009 | Lin |
| 7,649,915 | B2 | 1/2010 | Fermann |
| 7,672,342 | B2 | 3/2010 | Gohle |
| 7,782,910 | B2 | 8/2010 | Fermann |
| 7,804,863 | B2 | 9/2010 | Adel |
| 7,804,864 | B2 | 9/2010 | Gu et al. |
| 7,809,222 | B2 | 10/2010 | Hartl |
| 7,940,390 | B2 | 5/2011 | Kaertner |
| 7,982,944 | B2 | 7/2011 | Kippenberg |
| 8,040,929 | B2 | 10/2011 | Immeshev |
| 8,155,913 | B2 | 4/2012 | Eliyahu |
| 8,165,440 | B2 | 4/2012 | Hartl |
| 8,416,819 | B2 | 4/2013 | Grebing |
| 8,442,373 | B2 | 5/2013 | Hartl |
| 8,571,075 | B2 | 10/2013 | Fermann et al. |
| 8,818,154 | B2 | 8/2014 | Hartl |
| 8,861,555 | B2 | 10/2014 | Fermann |
| 8,970,252 | B2 | 3/2015 | Gupta |
| 9,036,971 | B2 | 5/2015 | Hartl |
| 9,166,361 | B2 | 10/2015 | Hartl |
| 9,557,219 | B2 | 1/2017 | Newbury |
| 2003/0156605 | A1 | 8/2003 | Richardson et al. |
| 2003/0185255 | A1 | 10/2003 | Ye |
| 2004/0000942 | A1 | 1/2004 | Kapteyn et al. |
| 2004/0081415 | A1 | 4/2004 | Demaray |
| 2005/0018714 | A1 | 1/2005 | Fermann et al. |
| 2008/0159341 | A1 | 7/2008 | Patel |
| 2009/0284828 | A1 | 11/2009 | Sosabowski |
| 2009/0296197 | A1 | 12/2009 | Holzwarth |
| 2010/0103413 | A1 | 4/2010 | Gohle |
| 2010/0195677 | A1 | 8/2010 | Fermann |
| 2010/0225897 | A1 | 9/2010 | Fermann |
| 2011/0019267 | A1 | 1/2011 | Li |
| 2011/0069309 | A1 | 3/2011 | Newbury |
| 2011/0080580 | A1 | 4/2011 | Fermann |
| 2011/0141540 | A1 | 6/2011 | Hochrein |
| 2011/0222562 | A1 | 9/2011 | Jiang |
| 2012/0039344 | A1 | 2/2012 | Kian |
| 2012/0205352 | A1 | 8/2012 | Fermann |
| 2012/0236314 | A1 | 9/2012 | Fermann |
| 2012/0281720 | A1 | 11/2012 | Fermann |
| 2012/0327959 | A1 | 12/2012 | Fermann |
| 2013/0293946 | A1 | 11/2013 | Fermann |
| 2014/0328358 | A1 | 11/2014 | Hartl |
| 2016/0094010 | A1 | 3/2016 | Hartl |

FOREIGN PATENT DOCUMENTS

| | | |
|---|---|---|
| JP | 11298072 A | 10/1999 |
| JP | 2001068771 A | 3/2001 |
| JP | 2002118315 A | 4/2002 |
| JP | 2002323636 A | 11/2002 |
| JP | 2003167281 A | 6/2003 |
| JP | 2005108554 A | 4/2005 |
| JP | 2006030288 | 2/2006 |
| JP | 2009064940 A | 3/2009 |
| JP | 2009542009 A | 11/2009 |
| WO | 0221644 A2 | 3/2002 |
| WO | 2007149956 A2 | 12/2007 |
| WO | 2010010438 A2 | 1/2010 |

OTHER PUBLICATIONS

B. R. Washburn et al. In Fiber-laser-based frequency comb with a tunable repetition rate, Opt. Expr, vol. 12. pp. 4999 (2004).

C.H. Li et al., A laser frequency comb that enables radial velocity measurements with a precision of 1 cm/s, Nature, vol. 452, pp. 610 (2008).

Chinese Office Action (Notification of First Office Action) issued Jan. 6, 2015, Application No. 201180057120.X.

F.R. Giorgetta et al., Fast high-resolution spectroscopy of dynamic continuous-wave laser sources, Nature Photonics, (2010).

J. Millo et al., Ultra-low-noise microwave extraction from fiber-based optical frequency comb, Opt. Lett., vol. 34, pp. 3707 (2009).

P. DelHaye et al., Optical frequency comb generation from a monolithic microresonator, Nature, vol. 450, pp. 1214 1217 (2007).

S. Bartaline et al., Frequency metrology with quantum cascade lasers, Proceedings of SPIE, vol. 7222, pp. 72220C1-1 72220c1-10 (2009).

S. Diddams et al., Molecular fingerprinting with the resolved modes of a femtosecond laser frequency comb, Nature, vol. 445, pp. 627 (2007).

T. Sizer in Increase in laser repetition rate by spectral selection, IEEE J. Quantum Electronics, vol. 25, pp. 97 103 (1989).

T. Udem et al., Optical frequency metrology, Nature, vol. 416, pp. 233 (2002).

Notification of Reasons for Refusal; Patent Application No. 2013-541994; Office Action issued: Oct. 8, 2015.

Hudson et al., "Mode-locked fiber laser frequency-controlled with an intracavity electro-optic modulator", Optics Letters, vol. 30, pp. 2948-2950 (2005).

Kerr-lens mode-locked lasers as ultra-low noise microwave sources, H. R. Telle et al, IEE Precision Electromagnetic Measurements Digest, 2000 Conference on , May 2000, pp. 507-508 DOI 10.1109/CPEM.2000.851104.

Chernikov et al., Integrated all optical fibre source of multigigahertz soliton pulse train, Electronics Letters 30th Sep. 1993 vol. 29 No. 20.

P. Dong et al, Low Vpp, ultralow-energy, compact, high-speed silicon electro-optic modulator, Dec. 7, 2009/vol. 17, No. 25/Optics Express 22484.

(56) References Cited

OTHER PUBLICATIONS

Duan, Intrinsic thermal noise of optical fibres due to mechanical dissipation, Electronics Letters Oct. 28, 2010 vol. 46 No. 22. DOI:10.1049/el.2010.1653.

J. Geng et al., Dual-frequency Brillouin fiber laser for optical generation of tunable low-noise radio frequency/microwave frequency, Optics Letters/vol. 33, No. 1/Jan. 1, 2008.

Fabien Kefelian et al., Ultralow frequency noise laser by locking to an optical fiber delay line, Optics Letters/vol. 34, No. 7/Apr. 1, 2009.

Lipphardt et al., The Stability of an Optical Clock Laser Transferred to the Interrogation Oscillator for a Cs Fountain, IEEE Transactions on Instrumentation and Measurement, vol. 58, No. 4, Apr. 2009.

L-S Ma et al, Delivering the same optical frequency at two places: accurate cancellation of phase noise introduced by an optical fiber or other time-varying path, Nov. 1, 1994/vol. 19, No. 21/Optics Letters 1777.

J. Millo et al, Ultralow noise microwave generation with fiber-based optical frequency comb and application to atomic fountain clock, Applied Physi S Letters 94. 141105 (2009).

E. Rubiola et al., Photonic-delay technique for phase-noise measurement of microwave oscillators, vol. 22, No. 5/May 2005/ J. Opt. Soc. Am. B 987.

Salik et al, Dual photonic-delay line cross correlation method for phase noise measurement, IFCS 2004 Proceedings of the 2004 IEEE International Frequency Control Symposium and Exposition 2004.

Schibli et al., Phase-locked widely tunable optical single-frequency generator based on a femtosecond comb, Sep. 1, 2005/vol. 30, No. 17/Optics Letters.

Schibli et al., Displacement metrology with sub-pm resolution in air based on a fs-comb wavelength synthesizer, Jun. 26, 2006/vol. 14, No. 13/Optics Express 5984.

Warren F. Walls, Cross-Correlation Phase Noise Measurements 1992 IEEE Frequency Control Symposium.

K. H. Wanser, Fundamental Phase Noise Limit in Optical Fibres Due to Temperature Fluctuations, Electronics Letters Jan. 2, 1992 vol. 28 No. 1.

FREQUENCY COMB SOURCE WITH LARGE COMB SPACING

CROSS REFERENCE TO RELATED APPLICATIONS

This is a Divisional Application of application Ser. No. 14/035,244 filed Sep. 24, 2013, which is a divisional of application Ser. No. 12/955,759, filed Nov. 29, 2010, now issued as U.S. Pat. No. 8,571,075 Oct. 29, 2013.

This application is related to U.S. patent application Ser. No. 12/895,127, filed Sep. 30, 2010, and entitled "Optical signal processing with modelocked lasers".

This application is related to U.S. patent application Ser. No. 12/630,550, filed Dec. 3, 2009, and entitled "Highly rare-earth-doped optical fibers for fiber lasers and amplifiers".

This application is related to U.S. patent application Ser. No. 12/399,435, filed Mar. 6, 2009, and entitled "Optical scanning and imaging systems based on dual pulsed laser systems".

This application is related to U.S. patent application Ser. No. 11/546,998, filed Oct. 13, 2006, and entitled "Laser based frequency standards and their application", now U.S. Pat. No. 7,809,222.

This application is related to U.S. patent application Ser. No. 11/372,859, filed Mar. 10, 2006, and entitled "Pulsed laser sources", now U.S. Pat. No. 7,649,915.

The disclosures of application Ser. Nos. 12/955,759, 12/895,127, 12/630,550, 12/399,435, 11/546,998, and 11/372,859 are hereby incorporated by reference in their entirety.

FIELD OF THE INVENTION

This invention relates to fiber comb sources and amplifiers with large comb spacing allowing for repetition rate and carrier phase control as well as their application in precision metrology.

BACKGROUND OF THE INVENTION

Fiber laser based comb sources are becoming increasingly the laser of choice for applications in precision spectroscopy. Many such applications demand large comb spacing on the order of a GHz or several GHz, precision comb control via adjustable repetition rates, as well as carrier phase control. Moreover, the timing jitter and the carrier phase noise of such fiber combs should be minimal.

Many applications for comb sources have indeed been identified and can comprise, for example, high precision frequency synthesis, all optical clocks (as described in T. Udem et al., 'Optical frequency metrology', Nature, vol 416, pp. 233 (2002) and frequency rulers for spectrograph calibration (as described in C. H. Li et al., 'A laser frequency comb that enables radial velocity measurements with a precision of 1 cm/s', Nature, vol., 452, pp. 610 (2008). Other applications have been identified in I. Hartl and M. E. Fermann, Laser based frequency standards and their applications, U.S. Pat. No. 7,809,222.

Another important application involves low phase noise micro-wave or radio-frequency sources for atomic frequency standards, radar and remote sensing as described in A. Bartels et al., Femtosecond-laser-based synthesis of ultrastable microwave signals from optical frequency references, Optics Letters, Vol. 30, Issue 6, pp. 667-669 (2005).

Notwithstanding numerous practical advances in fiber comb technology, fiber comb sources with large comb spacing are still difficult to manufacture and not readily applicable to mass production. Moreover, the generation of broad frequency spectra with widely spaced comb lines is challenging. Development of practical comb sources for use in the mid-IR spectral region remains particularly difficult.

SUMMARY OF THE INVENTION

In one aspect the present invention is directed to mass-producible fiber comb sources with large comb spacing and low noise, and their applications. The comb sources are based on mode locked waveguide oscillators.

At least one embodiment includes a mode locked waveguide comb laser having a compact dispersion control unit (DCU) in the laser cavity. The DCU may be capable of producing net GVD in a range from a positive value to a negative value, and preferably provides continuous adjustment of dispersion. In various implementations a DCU may provide much lower loss than achievable with dispersion compensators based on fiber Bragg gratings.

In various embodiments, the use of a single angularly dispersive optical element provides a very compact and easily adjustable dispersion compensation element. The dispersive element can be incorporated into a mode locked waveguide cavity, allowing for both repetition rate and carrier phase control and low carrier phase noise. In addition, low-loss bandwidth control is incorporated which is beneficial for the construction of pulse sources with high pulse energies.

By selection of large values of negative dispersion inside a high repetition rate mode locked waveguide cavity, good pulse stability is obtained.

Broadband super continuum generation is further facilitated with reduced power requirement via amplitude modulation of the output of the waveguide oscillator.

Difference frequency generation is also further facilitated with reduced power requirement via amplitude modulation of the output of the waveguide oscillator.

The individual comb lines are rapidly tunable by the implementation of cavity length tuning. The fiber laser output can further be locked to a single-frequency laser such as a quantum cascade laser to produce a rapidly tunable optical frequency synthesizer operating in the mid infra-red spectral region. Rapidly tunable frequency synthesizers can further be used in absorption spectroscopy.

Large comb spacing provides for resolution of individual comb lines using standard spectroscopic techniques and the implementation of broadband absorption spectroscopy.

Low phase noise micro-wave sources can be constructed using fiber comb lasers with large comb spacing by locking the comb laser to a precision optical reference frequency using a micro-wave beat signal between the optical reference and the comb laser. The beat signal frequency can further be mixed with the measured carrier envelope offset frequency of the comb laser to generate a secondary beat frequency which is independent of the carrier envelope offset frequency fluctuations of the comb laser. The noise properties of the micro-wave source can further be improved by actively stabilizing the output power of the comb laser with a feedback circuit connected to the pump power of the comb laser.

Multi-heterodyne spectroscopy can be performed using a mode locked laser with dual wavelength output.

DETAILED DESCRIPTION OF THE PREFERRED EMBODIMENTS

Figure 1:
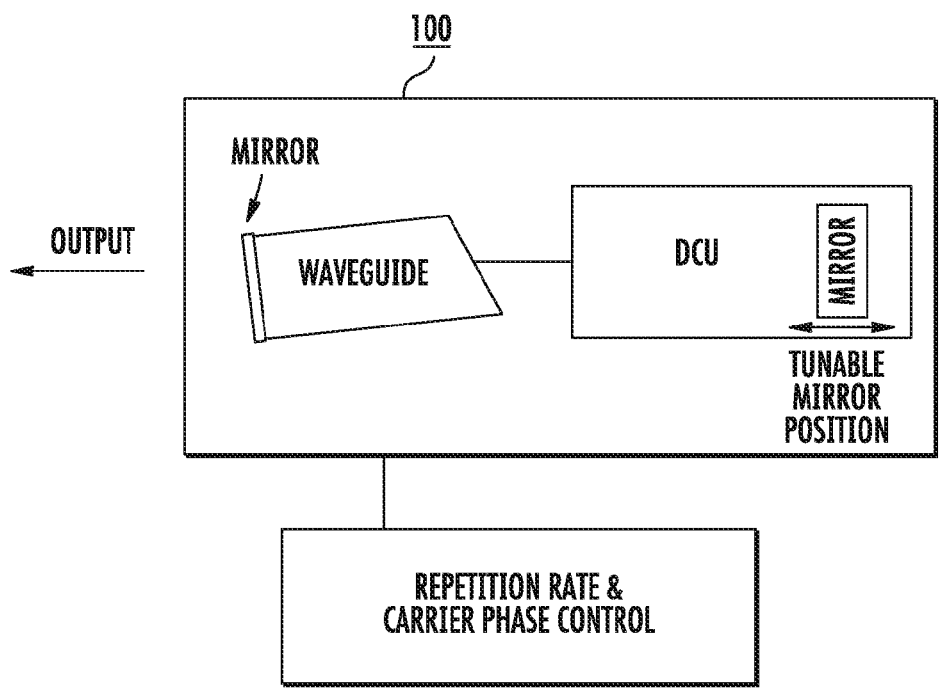
FIG. 1 is a schematic illustration of a mode locked waveguide comb laser having tunable comb spacing.

FIG. 1 represents an exemplary embodiment of a repetition rate tunable waveguide laser 100 with large comb spacing for use in a waveguide laser system. Tunable waveguide 100 laser may also include both repetition rate and carrier phase control, and a dispersion control unit (DCU). In this example, a Fabry-Perot cavity design with two cavity mirrors is shown, where the first cavity mirror (right side) is mounted on a piezoelectric transducer allowing for piston type of control. The other cavity mirror (left side) is used for output coupling, and in this example is adjoined to the waveguide. The first cavity mirror is also part of the dispersion control unit, which allows for setting of the overall cavity group velocity dispersion, where the overall cavity group velocity dispersion can preferably be set continuously from negative to positive values. Carrier phase can be controlled, for example, by controlling the optical pump power to the waveguide laser. An optical pump can be incorporated via appropriate beam splitters and is not separately shown. In various embodiments other techniques for controlling carrier phase may be utilized alone or in combination with pump control. For example, U.S. Pat. No. 7,649,915, FIGS. 8-10 and the associated text describe several techniques, including arrangements providing pressure and/or temperature control of intra-cavity elements.

Figure 1A:
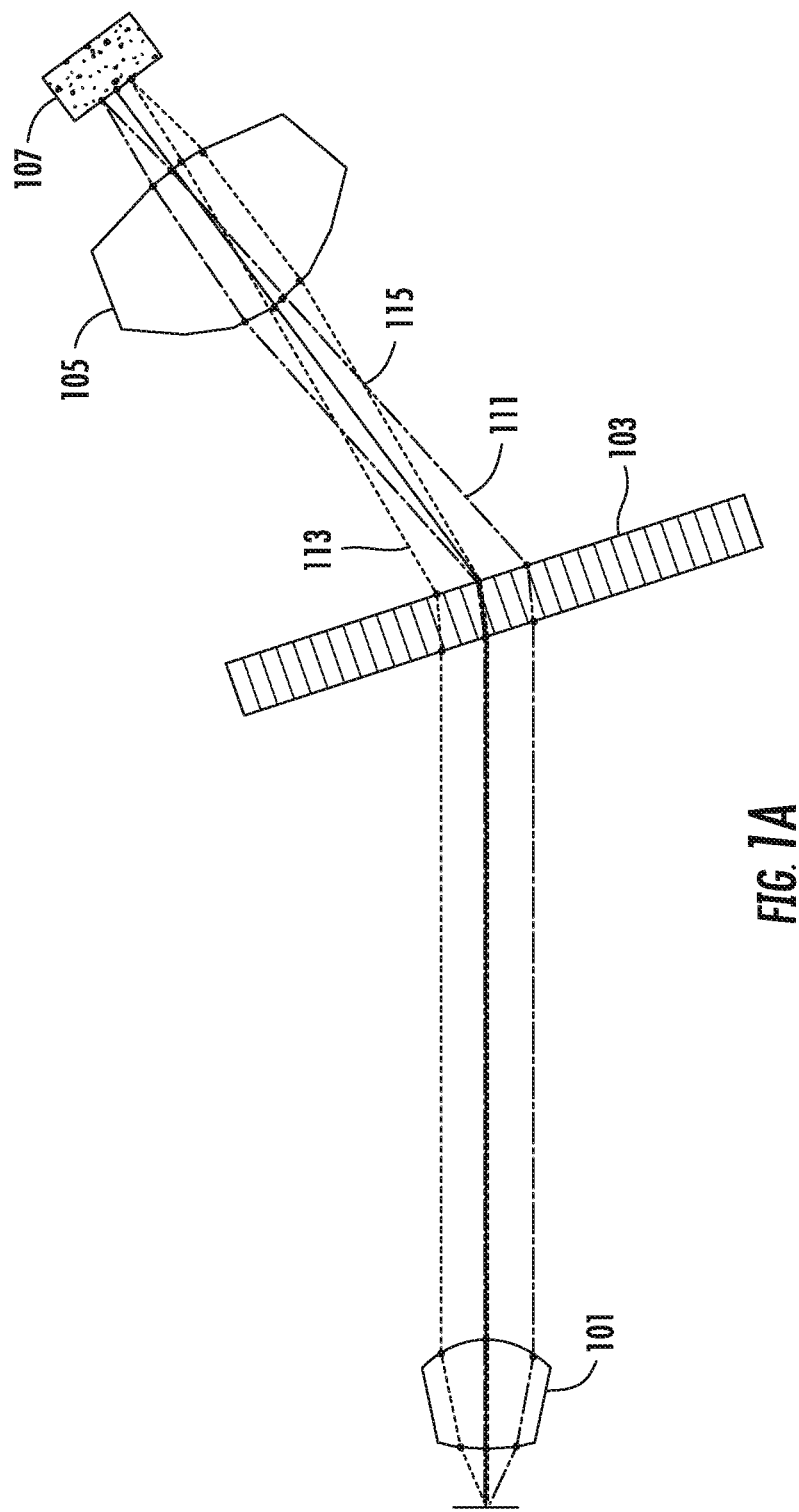
FIG. 1A is a schematic illustration of a compact dispersion control element to be used in conjunction with waveguides.

FIG. 1A represents an exemplary embodiment of a compact dispersion control sub-system to be used in conjunction with a waveguide. Such a dispersion control unit (DCU), is provided, which may include a bulk optic element 103 providing angular dispersion such as a bulk diffraction grating, a prism or a grism. In one configuration the system further comprises two lenses 101, 105 and a mirror 107. The lens 101 on the left hand side approximately collimates the output of the waveguide (not shown). The bulk optical element, diffraction grating 103 in this example, then diffracts the blue and red spectral parts of the collimated beam, 113 and 111 (short dash-long dash and dot) respectively, into different angular directions, and thus provides angular dispersion. The focusing lens 105 focuses the beam onto a mirror 107, which redirects the beams back to the grating 103 and to the waveguide input via the focusing lens 101. Because the beam being directed back to the waveguide has a spatial chirp, the beam reentering the waveguide has a limited bandwidth. However, such a bandwidth limitation can be very helpful to enhance laser stability when using such dispersion control as part of a mode locked waveguide laser cavity.

In the example of FIG. 1 a configuration is shown that produces negative group velocity dispersion, or simply negative dispersion. The group velocity dispersion introduced by this configuration is, to a first order approximation, determined by 1) the grating groove density and 2) by the separation of the back focal plane of the focusing lens 105 (the point 115 where the red and blue beams cross between the grating and the focusing lens) and the grating plane. For simplicity we refer to this distance as the effective grating separation (EGS). Here we refer to an EGS>0 when the beam crossing point is on the right hand side of the grating plane and an EGS<0 when the beam crossing point is on the left hand side of the grating plane.

It can be shown that the approximate value of the introduced group velocity dispersion by the effective grating separation is then close to the value of the group velocity dispersion introduced by a classical grating pair with the same separation. By adjusting this effective grating separation the dispersion can be adjusted from positive to negative, where positive dispersion is obtained when EGS<0 and negative dispersion is obtained for EGS>0. However, the advantage of using a single-grating (versus a classical grating pair) is that less loss is introduced at a central wavelength which is very important in the construction of fiber frequency combs in high Q cavities. In turn, high Q cavities are required for low noise operation.

Figure 1B:
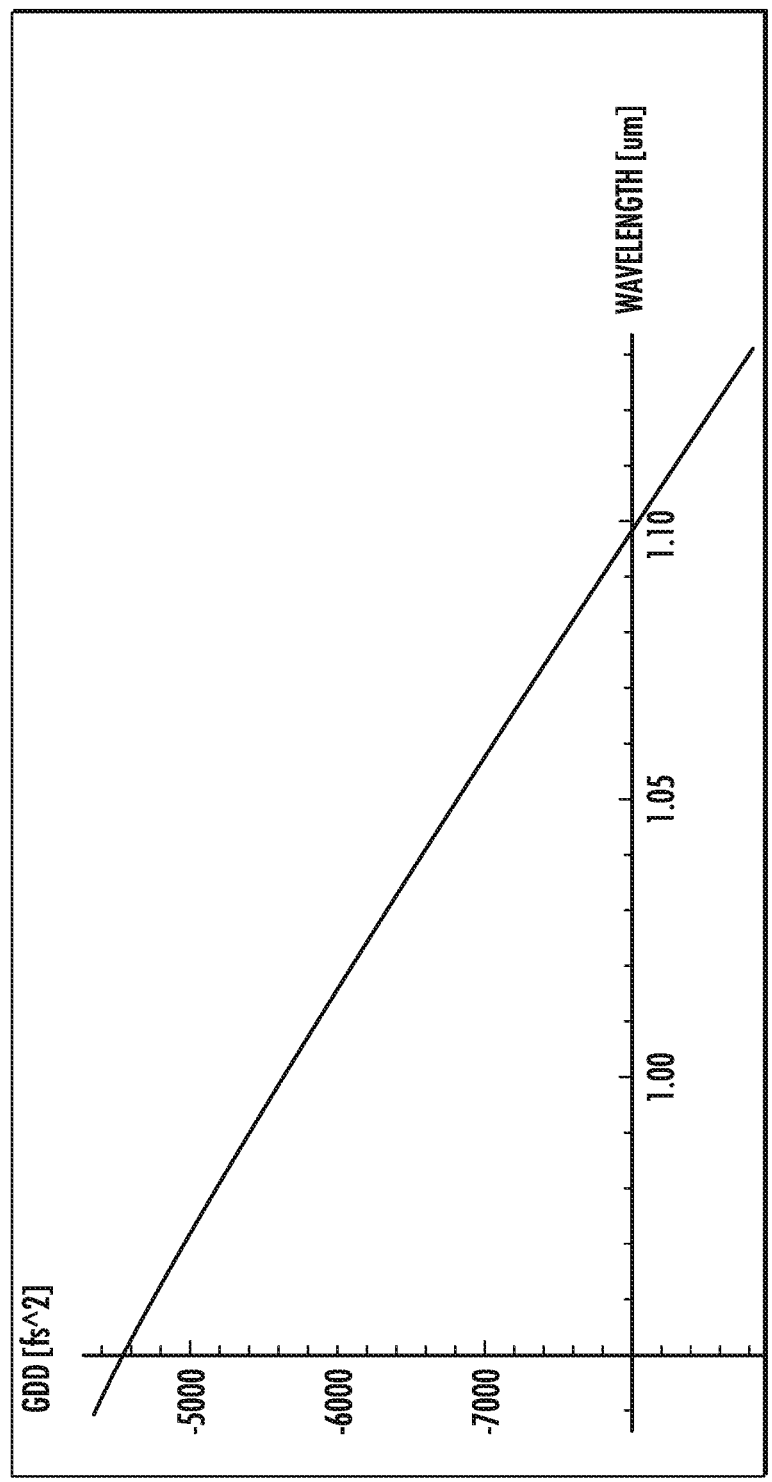
FIG. 1B is a plot illustrating dispersion of the compact element of FIG. 1A.

In this example, and as illustrated in FIG. 1B, a 600 l/mm grating is being used at a wavelength of 1050 nm, which produces a round-trip dispersion of around −7000 fs$^2$ for an effective grating separation of 5 mm. Diffraction gratings can have a diffraction efficiency of 98-99%, accounting for reflection losses on the lenses, such an adjustable dispersion control element can have a loss of only 5-10%.

Even lower losses can be achieved when replacing the lenses with mirrors or when replacing the diffraction grating with a prism made from a material such as ZnS. The equivalence of lenses and mirrors, and gratings and prisms for group velocity dispersion compensation applications is known from classical optics and does not require any further explanation.

Moreover, in some embodiments, instead of using two lenses only one lens or mirror in conjunction with an angular dispersion inducing element or a prism can be used to introduce a controlled amount of dispersion into a cavity. In the simplest configuration, an angle cleaved or polished waveguide can be used as a prism in conjunction with one or two lenses or mirrors to introduce a controllable dispersion into a cavity.

Figure 2:
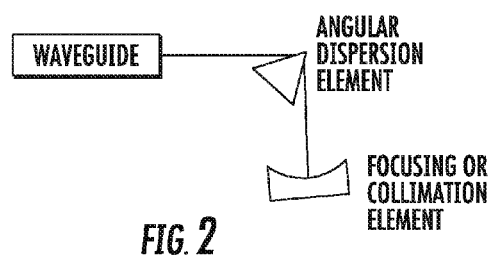
FIG. 2 is a schematic illustration of the generic components of a low loss dispersion control element to be used in conjunction with waveguides.

Several components of a low loss dispersion control unit are further exemplified in FIG. 2. In this example, elements of a dispersion control unit, shown at an output of the waveguide, include at least one collimation or focusing optical element and a single optical element producing angular dispersion. Moreover, a spatial chirp may optionally be introduced at the endface of the waveguide in retroreflection. Group-velocity dispersion may be introduced in the cavity with any suitable optical structure producing angular dispersion, and can be a prism (as schematically illustrated), grating, or any suitable combination of diffractive, reflective, or refractive structures in bulk and/or integrated configuration, configured in bulk optical material and/or on or near a surface.

Figure 3:
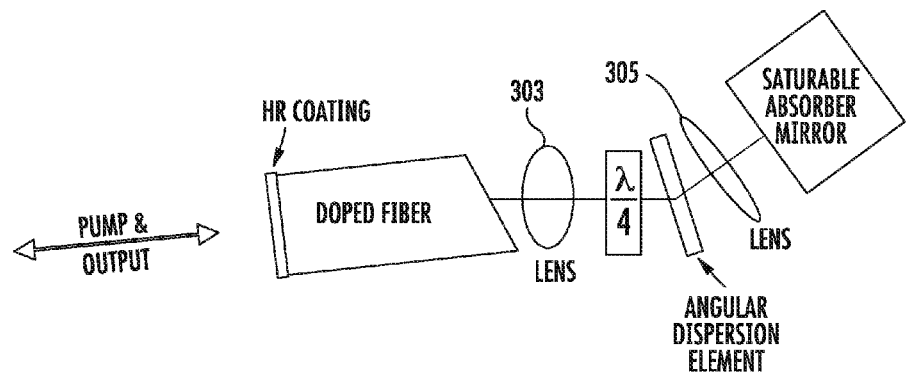
FIG. 3 is a schematic illustration of a mode locked fiber comb laser comprising a compact dispersion control element.

A dispersion control element as used in a compact frequency comb laser with large comb spacing is further shown in FIG. 3. In an exemplary embodiment a Yb doped fiber can be used. By way of example, U.S. patent application Ser. No. 12/630,550, entitled "Highly rare-earth-doped optical fibers for fiber lasers and amplifiers", discloses some high-gain fiber laser and amplifier configurations suitable for GHz repetition rate fiber lasers. This fiber can have a core diameter of 4 µm and can be designed with an Yb doping level providing an absorption of around 50 dB/cm at 976 nm. Such fibers can produce a gain of up to 5 dB/cm at 1030 nm when pumped with a few hundred mW at 976 nm. The pump side of the fiber can be directly coated with a dielectric coating providing almost 100% transmission at 976 nm and around 0.1-10% reflectivity at 1050 nm. The angle polished or angle cleaved side of the fiber can be anti-reflection coated. The saturable absorber mirror can be designed to limit damage from laser Q-switching as a distributed structure with enhanced two-photon absorption as disclosed in U.S. Pat. No. 6,956,887, 'Resonant Fabry-Perot semiconductor saturable absorbers and two photon absorption power limiters' to Jiang et al. Preferably a semiconductor based saturable absorber mirror is implemented, but a carbon nano-tube or graphene-based saturable absorber as well known in the state of the art can also be used.

The lens 303 on the left-hand side collimates the output of the fiber and can have a focal length of 0.45 mm and the lens 305 on the right hand side focuses the output onto the saturable absorber mirror and can have a focal length of around 1.12 mm. A quarter wave plate compensates for any possible polarization losses inside the cavity. When using low stress fiber mounting, depolarization in the intra-cavity fiber can be eliminated and the quarter waveplate can also be omitted. Alternatively, as known in the art, the polarization inside the fiber can be appropriately adjusted by the application of external stresses.

A transmission grating with groove density of 1000 l/mm with a diffraction efficiency of >98% at 1050 nm can be used for dispersion control. The lenses 303, 305 can have a combined double pass optical path length of 7 mm, whereas the grating can have a round-trip optical path length of 3 mm. In a Littrow configuration the grating produces a dispersion of around $-6700$ fs$^2$ per mm effective grating separation. Hence an effective grating distance of only 0.5 mm is required to compensate for the round trip dispersion of around 4 cm of silica fiber operating at 1050 nm.

The typical free space round trip optical path length for an effective grating separation of 0.5 mm of the above example is thus calculated as 15 mm. Assuming a fiber length of 5 mm, the total round trip optical path length can be 30 mm. Hence a mode locked fiber laser with a repetition rate up to around 10 GHz can be constructed in this way. The mode locked fiber laser further operates in the negative dispersion regime. The total round trip cavity loss can be as small as 10% or smaller One benefit of using a dispersion control element as shown is that the intra-cavity loss is low, producing a high Q cavity and low carrier phase noise, while providing for flexibility for adjustment. The carrier envelope offset frequency can be easily adjusted by either tilting the mirror containing the saturable absorber or by movement of one of the two lenses perpendicular to the beam direction in the plane of the drawing of FIG. 1. Alternatively a slit or an edge may be moved along the same direction. The repetition rate can further be adjusted by applying a piston-type movement to the saturable absorber mirror. Moreover, other means of repetition rate and carrier phase control can be implemented as, for example, described in U.S. Pat. No. 7,649,915 to Fermann et al., and U.S. Pat. No. 7,809,222 to Hartl et al.

A mode locked comb laser was constructed according to the schematic illustrations shown in FIGS. 1 and 3, where a repetition rate of 1.5 GHz was obtained with a Yb fiber length of 4 cm, where the intra-cavity loss was around 30-40%. The system operated with an intra-cavity peak power of around 75 W at modelocking threshold with a pulse width of 400 fs. The corresponding minimum amount of self-phase modulation to achieve modelocking was estimated as 0.06. The laser operated with an intra-cavity dispersion of around $-2000$ fs$^2$ and was generating soliton pulses. The corresponding fiber dispersion was around $+3200$ fs$^2$. Assuming the same self-phase modulation and peak power requirements at 10 GHz, the required peak intra-cavity power at 10 GHz in such a laser for stable modelocking is calculated as 600 W, corresponding to an average intra-cavity power of 2.4 W, which is achievable when pumping with single-mode diode laser pump sources. Generally, an overall cavity dispersion of $-0.1\text{FD}<-\text{FD}<-10\text{FD}$ or preferably a range of $-0.3\text{FD}<-\text{FD}<-6\text{FD}$ is desirable for the generation of stable soliton pulses at >1 GHz repetition rates, were FD is the absolute value of the fiber dispersion. The lower limit (in absolute value) is governed by laser stability considerations, whereas the upper limit is determined by the objective to produce the shortest pulses possible for subsequent coherent supercontinuum generation. For later reference we refer to these values as the soliton stability regime.

In addition to Yb doped fiber, other rare-earth doped fibers using dopants such as Er, Er/Yb, Tm, Ho/Tm, Ho, Nd or Pr may also be incorporated for the construction of fiber frequency combs with large comb spacing. Instead of a bulk optics arrangement as shown here for dispersion control, chirped mirrors, Gires Tournois mirrors as well as dispersive saturable absorber mirrors can also be used for providing adjustable amounts of dispersion into a cavity. Schemes for appropriate dispersion and carrier envelope offset frequency control at GHz repetition rates were, for example, discussed in U.S. Pat. No. 7,649,915. When using fibers with overall negative dispersion, dispersion compensation is not required and repetition rates >10 GHz can be obtained with no or few free space optics parts.

In addition to being valuable in the design of high repetition rate lasers, the compact dispersion control unit from FIG. 1 can also be used as a bandwidth-limiting device in the design of fiber lasers operating in the positive dispersion regime and similariton fiber lasers as, for example, disclosed in U.S. Pat. Nos. 6,885,683 and 7,782,910. In contrast to an optical filter or a fiber Bragg grating, the dispersion control unit from FIG. 1 can be used for providing a smoothly adjustable bandpass filter with zero or adjustable dispersion. Such an arrangement is advantageous for the generation of high energy pulses. Such a bandpass filter can be incorporated at the end of a Fabry-Perot cavity or as part of a ring cavity or even more complex cavity designs using appropriate optical components. Polarization maintaining designs are also possible. In the case of a Fabry-Perot cavity, a cavity design as shown in FIG. 3 can be implemented. In the case of a ring cavity the compact dispersion control unit could be incorporated via an appropriately inserted polarization beam splitter. Many cavity designs for mode locked lasers or passively mode locked lasers are known in the art and the present design can be incorporated into any of those.

Figure 4:
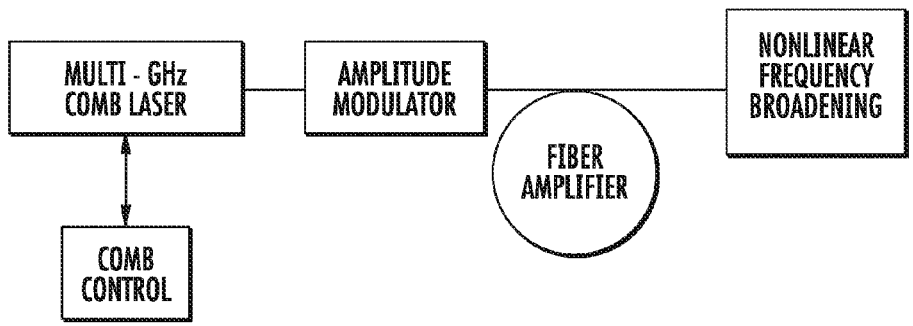
FIG. 4 is a schematic illustration of a mode locked fiber comb laser system with large comb spacing, including an external modulator for super continuum and difference frequency generation with reduced power requirements.

One issue with comb lasers having large comb spacings is the increased average power requirement for nonlinear spectral or frequency broadening that arise when increasing the comb or mode locked laser repetition rate to the multi-GHz regime. A way to avoid such a limitation is shown in FIG. 4. Here an amplitude modulator is inserted after the frequency comb source to slowly amplitude modulate the comb laser output. For example such an amplitude modulator can be operating at a frequency of 1 kHz and produce a mark to space ratio of 1 to 10, i.e. a transmission opening for around 100 µs and blocked transmission for around 900 µs. One or more fiber amplifiers may be disposed downstream from the modulator. The pump power requirements for a fiber power amplifier to generate pulses with a certain peak power are thus reduced by about a factor of ten. After amplification the pulses can then be coupled into one or several nonlinear frequency broadening stages that can comprise, for example, supercontinuum generation and difference frequency generation. In various embodiments a highly non-linear fiber (HNLF) may be utilized in one or more stages. Such arrangements were discussed in U.S. patent application Ser. No. 12/895,127 and other applications incorporated by reference herein. Due to the reduced average power requirements in this implementation thermal management of the whole assembly is also greatly simplified. Any amplitude modulator can be implemented, particularly useful are electro-optic modulators that can further be controlled to compensate for time-varying responses of the fiber power amplifier, i.e. by appropriately controlled modulation a square pulse can be generated at the output of the power amplifier and ringing and overshoots in the fiber amplifier can be avoided. Such designs are well known in conventional fiber amplifier technology and need no further explanation.

By implementing a relatively low amplitude modulation frequency and a relative long opening window, the spectral bandwidth of the individual comb lines is only minimally affected as the achievable individual comb bandwidth is approximately the inverse of the transmission window. For a 100 µs transmission window a comb line width of around 10 kHz can thus be achieved. The repetition rate as well as the carrier envelope offset frequency of the comb laser can be controlled using, for example, at least one cw reference laser. Such schemes are well known in the state of the art.

Alternatively, an f-2f interferometer (not shown) can be inserted via a beam splitter after the nonlinear frequency broadening stage. The carrier envelope offset frequency can thus be directly measured; moreover, the carrier envelope offset frequency can be controlled using appropriate electronic feedback to the oscillator pump current or other intra-cavity components as discussed with respect to FIG. 1. Low noise comb lasers are beneficial for such schemes because they minimize carrier phase fluctuations between separate temporal transmission windows of the amplitude modulator. Any suitable rare-earth amplifier can be implemented in such schemes, moreover, solid-state, semiconductor based or micro-ring resonator based multi-GHz oscillators can be implemented here in conjunction with fiber amplifiers. Appropriate micro-ring resonators were, for example, described in P. Del'Haye et al., 'Optical frequency comb generation from a monolithic microresonator', Nature, vol. 450, pp. 1214-1217 (2007). Such fiber comb sources can be broadly applied as frequency rulers as, for example, required in the calibration of astronomical spectrographs.

Some applications may require even higher repetition rates and these can, for example, be produced by the incorporation of repetition rate multiplication cavities, i.e. cavities that are configured with an optical round-trip path length at precisely a harmonic of the oscillator round-trip path length. Repetition rate multiplication with factors of 2-100 can then be readily achieved as is well known in the state of the art and was, for example, suggested in T. Sizer in 'Increase in laser repetition rate by spectral selection', IEEE J. Quantum Electronics, vol. 25, pp. 97-103 (1989) and U.S. patent application Ser. No. 12/895,127 'Optical signal processing with modelocked lasers', to Fermann et al. and is not further described here.

Figure 5:
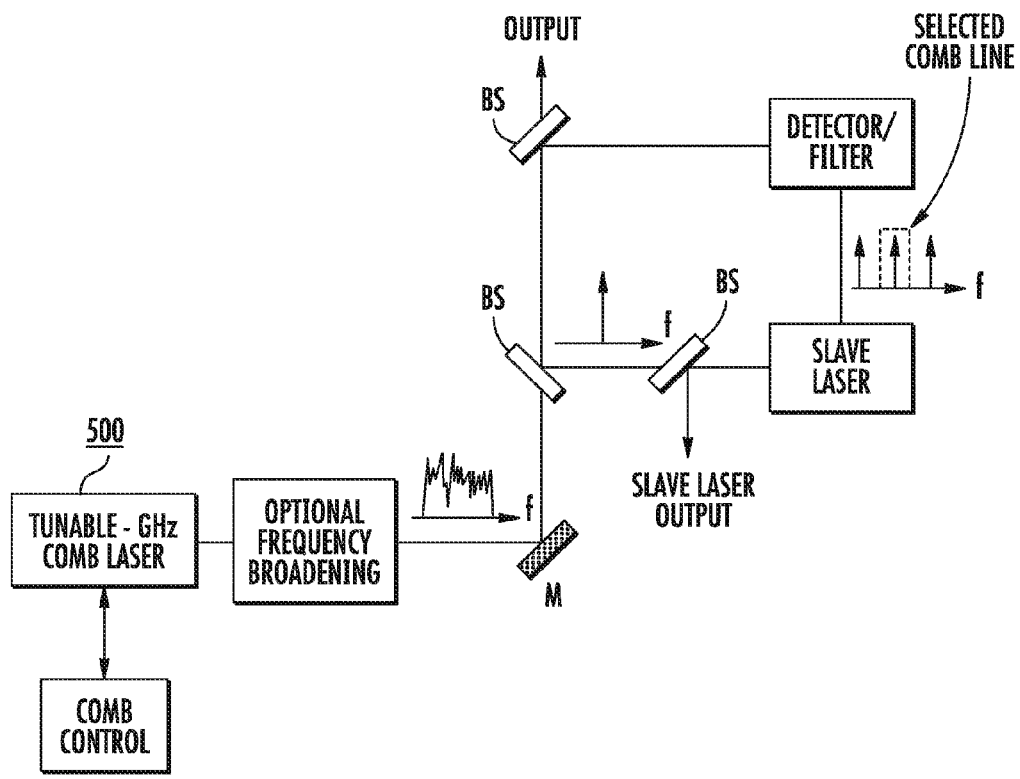
FIG. 5 is a schematic illustration of a repetition rate tunable laser system coherently coupled to a single-frequency laser.

A combination of the systems shown in FIGS. 3 and 4 allows the construction of rapidly tunable frequency synthesizers. Such a design is schematically shown in FIG. 5. Referring to FIG. 5, the synthesizer system includes a tunable GHz comb laser 500 coupled to a comb controller for repetition rate control. A tunable multi-GHz fiber comb system can be constructed using a design as shown in FIG. 3 by locating the saturable absorber mirror onto a piezoelectric transducer (not shown) with piston control which modifies the repetition rate of the laser. Due to the spatial chirp of the beam on the saturable absorber such a scheme can also produce some variations in carrier envelope offset frequency.

Alternatively, a mode locked fiber laser with repetition rate control and low variation in carrier envelope offset frequency can be derived from the design shown in FIG. 3 by applying a piston type of control to a cavity mirror where there is no spatial chirp. For example the pump light could be coupled into the doped optical fiber by removing the dichroic coating on the left hand side of the fiber as shown in FIG. 3 and replacing it with a bulk optics dichroic beam splitter. The pump light can then be coupled into the fiber via the beamsplitter and the intracavity light can be directed onto a separate mirror with piston control. Additional beam splitters could be inserted for output coupling or simply the residual zero order output of the intra-cavity grating could be used for output coupling. Other cavity designs were, for example, discussed in FIGS. 17a and 17b of U.S. patent application Ser. No. 12/895,127 'Optical signal processing with modelocked lasers', to Fermann et al. and are not further explained here. Other implementations and variations are possible.

Referring again to FIG. 5, after the tunable comb generator 500, an optional nonlinear spectral or frequency broadening stage (as discussed above with respect to FIG. 4) is included for increased spectral coverage. A single line from the broadband spectral output is then mixed with the output of a wavelength tunable single-frequency slave laser, for example a quantum cascade laser. A quantum cascade laser may have a nominal wavelength in the mid to far infrared IR wavelength range. By directing the comb output and the quantum cascade laser output onto a detector and limiting the detection bandwidth of the detector using a detector/filter arrangement (e.g.: photodetector and RF filters) a particular comb line can be selected as illustrated. Additional optical filters can also be implemented for comb line selection or to reduce the shot noise on the detector. RF and optical filtering techniques are well known in the state of the art and are not further explained here. Tunable single-frequency lasers derived from locking the optical frequency of the single-frequency laser to the output of a tunable comb lasers were, for example, discussed by B. R. Washburn et al. in 'Fiber-laser-based frequency comb with a tunable repetition rate', Opt. Expr, vol. 12. Pp. 4999 (2004). However, only a comb spacing of 50 MHz was used.

The output from the detector/filter module may be utilized to control the slave laser in a feedback arrangement. The beat signal between the continuum output from the broadening stage and the slaved single-frequency laser, which may preferably be a quantum cascade laser, can then be used in the feedback loop to control the wavelength of the single frequency slave laser as illustrated in FIG. 5. Analog and/or digital signal processing (not shown) may also be utilized in the feedback system to monitor and/or control various parameters. For example, while tuning the repetition rate of the comb laser the output wavelength of the quantum cascade slave laser can also be tuned by simply keeping the beat signal frequency constant. This can be done, for example, by appropriately controlling the drive current to the quantum cascade laser, or controlling its temperature, as well known in the state of the art. Other schemes for wavelength tuning of quantum cascade lasers were, for example, discussed in S. Bartaline et al., 'Frequency metrology with quantum cascade lasers', Proceedings of SPIE, Vol. 7222, pp. 72220C1-1-72220c1-10 and are not further discussed here.

One benefit of a fiber comb laser with large comb spacing is that wavelength calibration is simplified because of the reduced number of spectral lines; moreover the required piston movement $\delta L$ for a certain frequency shift $\delta f$ is proportional to the square of the repetition rate of the comb laser, i.e. $\delta f = cf^2 \delta L$. The use of a low noise high repetition rate comb laser allows for rapid frequency synthesis with a quantum cascade laser while minimizing the requirements for carrier envelope offset frequency stabilization of the comb laser. For applications requiring only a moderate frequency resolution of 10-100 MHz, continuous control of the carrier envelope offset frequency can even be eliminated. Comb laser repetition rates for frequency synthesis with quantum cascade lasers of >1 GHz are particularly desirable; for some applications repetition rates >250 MHz can be sufficient. When using difference frequency mixing in order to generate a spectral output in the vicinity of the quantum cascade laser, the carrier envelope offset frequency is set to zero as is well known in the state of the art and, for example, discussed in U.S. Pat. No. 6,724,788 to Holzwarth et al. This allows the determination of the optical frequency of the single-frequency laser from just the repetition rate of the comb laser as well as the frequency comb order.

Figure 6:
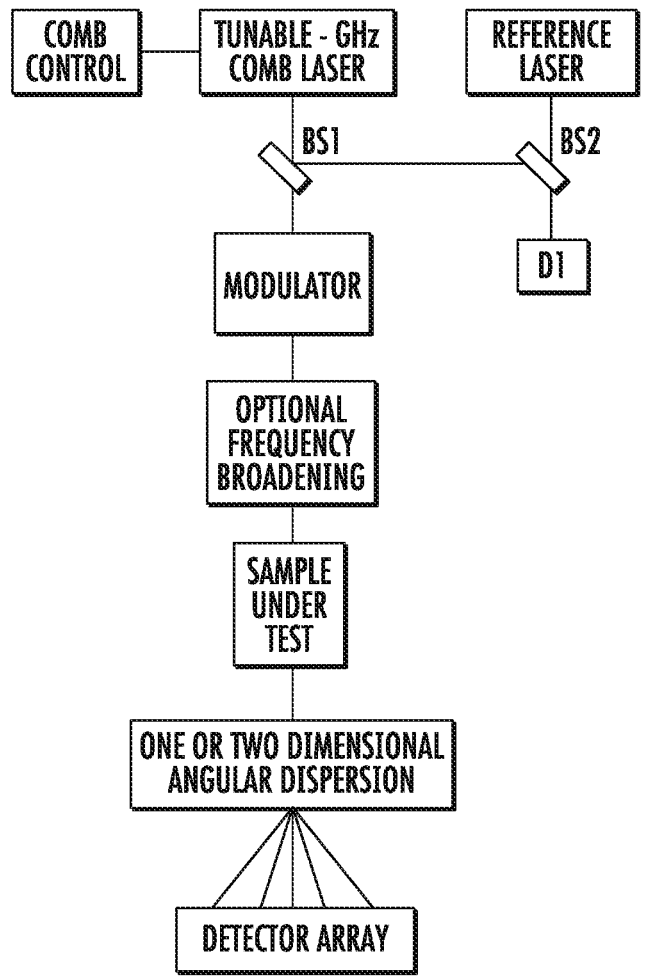
FIG. 6 is a schematic illustration of a repetition rate tunable comb laser system for use in broad band precision spectroscopy.

Frequency comb lasers with large comb spacing can further implemented in high resolution spectroscopy applications in combination with conventional spectroscopic elements as shown in FIG. 6. Here a repetition rate tunable fiber frequency comb laser with a comb spacing >1 GHz based on rare-earth dopants such as Yb, Tm, Nd, Pr, Er, Er/Yb or Ho or Ho/Yb is illustrated. The comb laser can further include a means for control of the repetition rate and carrier envelope offset frequency, for example as discussed with respect to FIG. 1 and FIG. 3. Further, as illustrated in FIG. 6, detector D1 receives outputs from a reference laser and a tunable comb laser and derives a beat signal useful for frequency monitoring, or for control of the tunable GHz laser via a feedback loop (not shown). Optical referencing can, for example, comprise interfering the comb with a fixed continuous wave reference laser as also shown in FIG. 6 using two beamsplitters BS1 and BS2 as well as detector D1 for detection of the beat signal. The observed beat frequency is then directly proportional to the distance between a comb line and the single frequency laser in frequency space.

As illustrated in FIG. 6, an optical frequency or spectral broadening stage can be used, and may be disposed downstream of the amplitude modulator. This spectral broadening stage can employ difference frequency mixing in order to eliminate the uncertainty of the carrier envelope offset frequency in the comb output. An additional amplitude modulator can also be used as discussed with respect to FIG. 4 so as to reduce the average power requirements for nonlinear spectral broadening. Also, additional fiber amplifiers (not shown) can be implemented after the amplitude modulator as discussed with respect to FIG. 4.

The output from the pulse source then passes through a sample under test, for example a gas cell, before being dispersed in one or two dimensions with one grating spectrometer and a virtually imaged phase array (VIPA) as is well known in the state of the art. With sufficient comb spacing the individual comb lines can then be resolved in one or two dimensions and imaged onto a one or two dimensional detector array respectively. An optical resolution of around 1-10 GHz per pixel of the detector is thus achievable.

A scheme with a solid-state laser based multi-GHz repetition rate comb system and a two dimensional angular dispersion element as well as a two dimensional detector array was previously described in S. Diddams et al., 'Molecular fingerprinting with the resolved modes of a femtosecond laser frequency comb', Nature, vol. 445, pp. 627 (2007). However, a system with a fiber laser based multi-GHz repetition rate comb laser was not considered. With advancements as described herein low noise frequency comb lasers operating at repetition rates of 10 GHz and higher can be constructed which make such schemes very attractive. Moreover, a frequency resolution equivalent to the comb line width can be obtained by slowly scanning the repetition rate of the frequency comb laser while detecting the modulation of the signal on each individual pixel of the detector array. For frequency comb spacings larger than around 10 GHz, a two dimensional detector array is also not required as individual comb lines can, for example, be resolved using two or more conventional diffraction gratings in series or multiple passes or reflections from a single grating. The use of a single-dimensional detector array generally reduces the cost of the detection system while increasing the acquisition speed.

In addition the position of the comb lines can be slowly scanned and at the same time modulated at high frequencies in frequency space in order to enable broad band differential absorption spectroscopy on multiple absorption bands simultaneously. Such schemes are well known from single laser spectroscopy. Many other spectroscopic techniques can be adapted to broad band detection where the principle requirement is the optical resolution of individual comb lines.

The generic set-up of such detection schemes involves multi-comb line frequency analysis, where a tunable fiber frequency comb generator is provided, a sample is illuminated with the plurality of the comb lines, the individual comb lines are transmitted through- or reflected from the sample and are optically resolved and imaged onto a one or two dimensional detector array and a physical characteristic of the sample is determined from the response of the detector array to the physical characteristic of the sample.

The individual frequencies of the individual comb lines can be determined or controlled by measurements of the instantaneous repetition rate of the frequency comb as well as the instantaneous carrier envelope offset frequency using, for example, an f-2f interferometer (not shown) as well known in the state of the art. Other methods of determining the instantaneous frequencies of the comb lines are also possible and can, for example, involve optical referencing. As discussed above, optical referencing can, for example, comprise interfering the comb with a fixed continuous wave reference laser as also shown in FIG. 6 using two beam-splitters BS1 and BS2 as well as detector D1 for detection of the beat signal. The observed beat frequency is then directly proportional to the distance between a comb line and the single frequency laser in frequency space. Optical hybrids (as well known in the state of the art) can further be implemented to determine on which side of the cw laser the comb line is located. More than one cw reference laser can further be implemented to measure the absolute location of the scanning comb in frequency space. Optical referencing has the advantage that no precise control of the actual carrier envelope offset frequency or repetition rate of the tunable comb laser is required. Optical referencing was, for example, discussed in U.S. patent application Ser. No. 12/895,127 'Optical signal processing with modelocked lasers', to Fermann et al. Several other schemes for the measurement of the instantaneous optical frequency of frequency swept single-frequency lasers were discussed in F. R. Giorgetta et al., 'Fast high-resolution spectroscopy of dynamic continuous-wave laser sources, Nature Photonics, (2010) and are not further discussed here. When applying these methods it is beneficial to filter out one individual comb line as easily possible with widely spaced comb lines, for example, by using fiber gratings.

Figure 7:
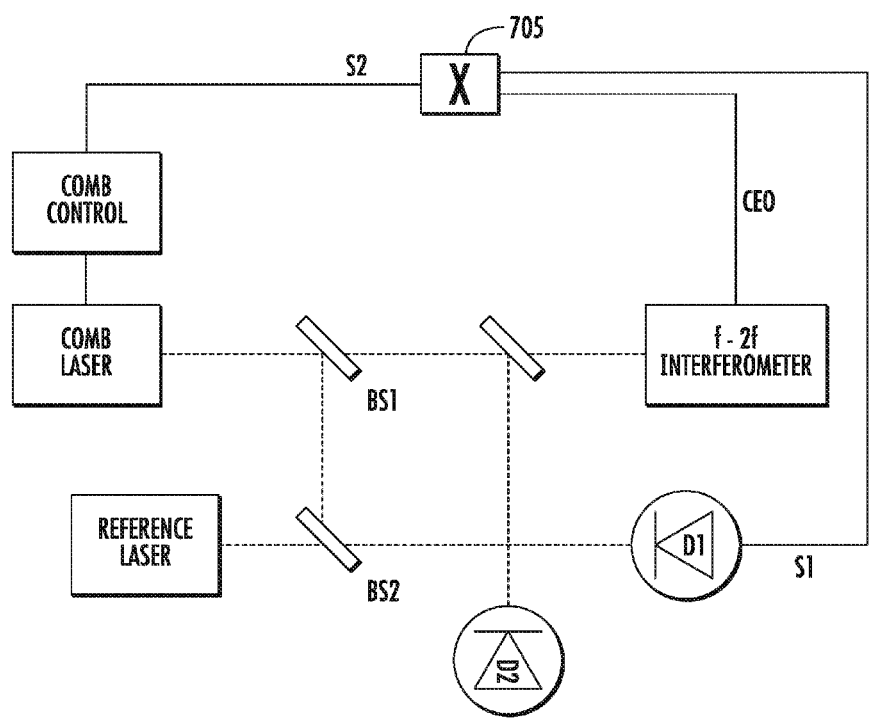
FIG. 7 is a schematic representation of a low phase noise micro-wave source based on a fiber laser with large comb spacing.

Another attractive application of fiber frequency comb lasers with large comb spacing is as low phase noise micro-wave sources. An exemplary embodiment of a low phase noise fiber comb based micro-wave source is shown in FIG. 7. In the example of FIG. 7 optical paths are depicted with dashed lines and electrical feedback signal paths with solid lines.

A fiber comb laser with a comb spacing >1 GHz is shown in FIG. 7. One of the comb lines from the comb laser is combined with the output of an optical continuous wave reference laser and detected with detector D1 as earlier discussed, for example with respect to FIG. 5. Detector D1 of FIG. 7 produces a corresponding first beat frequency, S1.

The carrier envelope offset frequency of the comb laser is also detected with the f-2f interferometer (as well known in the state of the art). The carrier envelope offset frequency can be phase locked to an RF source or be left free running as described in J. Millo et al., 'Ultra-low-noise microwave extraction from fiber-based optical frequency comb', Opt. Lett., vol. 34, pp. 3707 (2009). As described in J. Millo et al., the measured carrier envelope offset frequency can further be mixed with the first beat frequency to produce a secondary beat frequency which is independent of the carrier envelope offset frequency fluctuations. FIG. 7 schematically illustrates a feedback arrangement with feedback signals from both the f-2f interferometer output (CEO) and detector D1 output (S1). RF mixer 705 provides an output at a secondary beat frequency S2 which is transmitted to the comb control module, which is configured for at least repetition rate control of the comb laser. The secondary beat frequency (S2) is then phase locked to a low noise RF reference signal (not shown), which in turn stabilizes the repetition rate of the comb laser independent of carrier envelope offset frequency fluctuations. As a result, a low phase noise micro-wave signal can then be extracted via directing the optical output of the comb laser onto detector D2. Other modifications are also possible.

To further reduce the phase noise of the micro-wave source the amplitude fluctuations of the laser can be minimized by stabilizing the output power of the fiber comb laser via a secondary feedback loop connected to the laser pump (not shown). Because of the large modulation bandwidths of Yb and Tm fiber lasers, amplitude noise minimization via pump power control can be much more effective compared to Er fiber lasers, as used by J. Millo et al. Moreover, repetition rates >1 GHz are further very beneficial for detecting a low phase noise micro-wave signal from detector D2 as they minimize shot noise on the detectors. Preferably for a 10 GHz micro-wave reference an optical comb laser with a 10 GHz comb spacing is used, with about 1 GHz or greater being suitable.

Although the optical separation of frequency comb lines is attractive for some applications, various other applications are better served by simultaneous detection of all comb lines and distinguishing them by the beat signals as, for example, done in multi-heterodyne spectroscopy as described in U.S. patent application Ser. No. 12/895,127 'Optical signal processing with modelocked lasers', to Fermann et al. A common design limitation of such systems is the requirement for coherent pulse pairs that slowly scan through each other thereby producing a pulse separation which varies as a function of time. Such coherent scanning delay lines are conveniently produced using, for example, two comb lasers operating at slightly different repetition rates or alternatively using a repetition rate tunable comb laser in conjunction with imbalanced Mach-Zehnder interferometers. Both systems are relatively complex and the latter system further requires mechanical moving parts which are not permissible in some applications.

On the other hand it has long been known, however, that only one laser can be configured as a scanning delay line as, for example, described in U.S. Pat. No. 5,479,422: 'Controllable dual-wavelength operation of modelocked lasers' to Fermann et al. The comb laser system as described with respect to FIG. 3 hereof greatly simplifies the construction of such scanning delay lines as explained with respect to FIG. 1. With an arrangement as shown in FIG. 1A, and after angular separation and focusing of the beam diffracted by the intra-cavity grating, the red and blue parts of the optical pulse spectrum can be well separated on the saturable absorber. Therefore dual wavelength operation can be induced by simply incorporating an appropriate groove on the saturable absorber mirror or locating a thin wire in front of the saturable absorber mirror. Moreover, the repetition rates of each color can be separately controlled by splitting the saturable absorber in half and putting one of the two halves onto a piezo-electric controller which incorporates piston movement.

Figure 8:
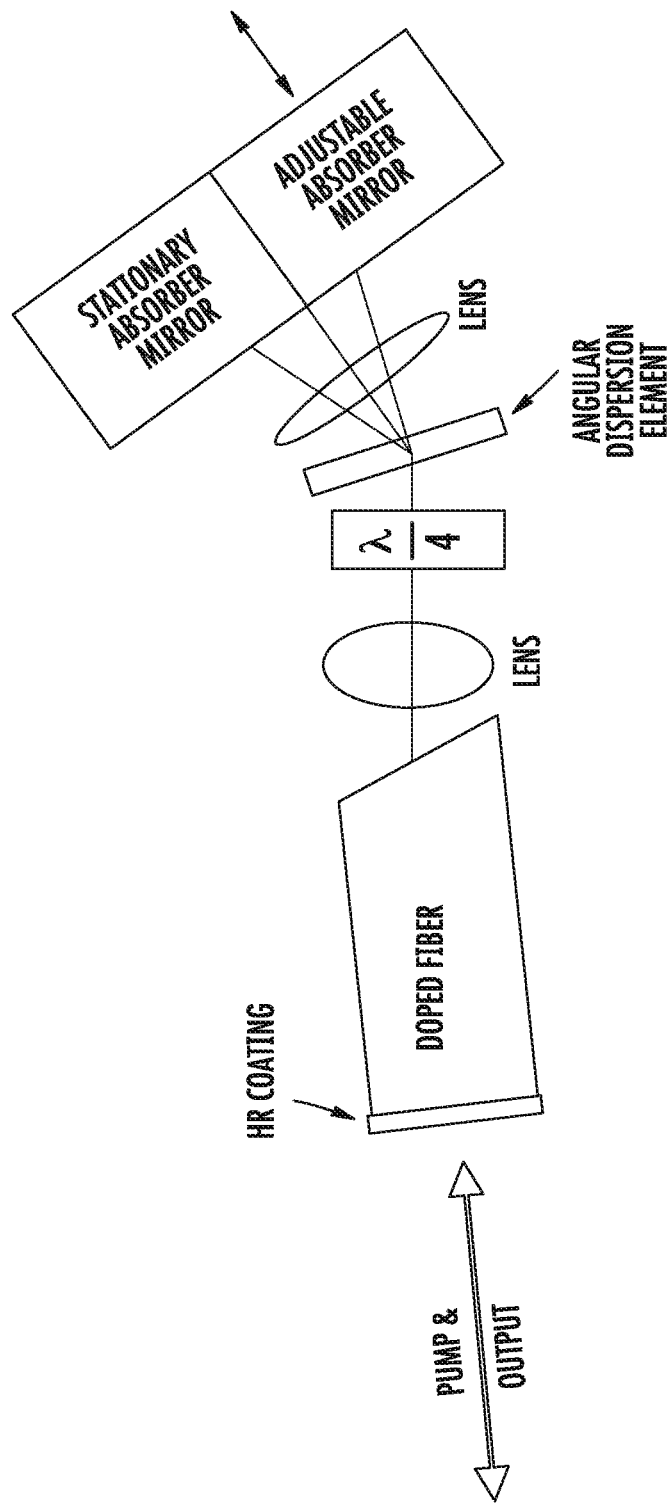
FIG. 8 is a schematic illustration of a multi-heterodyne spectroscopy system using a mode locked laser operating simultaneously on two wavelengths.

An exemplary dual wavelength comb system is shown in FIG. 8. It is very similar to the design shown in FIG. 3, but it now includes the split saturable absorber mirror, where one half is stationary and the other half is mounted on a piezo-electric transducer with piston type control for adjustment of the difference in repetition rates between the two wavelengths. The two wavelengths can further be separated by including a thin wire inserted between the focusing lens in front of the saturable absorber mirror and the saturable absorber mirror itself, where the wire straddles the intersection between the moving and stationary mirror.

Other coherent scanning delay lines based on two wavelength lasers can also be constructed, for example the angular dispersive components and other optical elements as shown in FIG. 1A can also be inserted in front of a regular intra-cavity mirror that does not contain a saturable absorber.

Also conventional dispersion compensating elements such as bulk grating pairs can be used for wavelength separation. Further, as described in U.S. Pat. No. 5,479,422 gain media with inhomogenous broadening such a Nd are particularly attractive for dual wavelength operation as they minimize cross saturation effects. However, the design as shown in FIG. 8 is particularly attractive because of the low component count and can ensure long term stable operation.

Such dual wavelength lasers operating at slightly different repetition rates can then be used for multi-heterodyne spectroscopy by implementing additional spectral broadening stages after the oscillator which produce spectral overlap between the outputs of the oscillators. Once spectral overlap between the two combs exists, beat signals between comb pairs belonging to the two different repetition rates can be detected and used for multi-heterodyne spectroscopy. Moreover, the two repetitions rates can be locked to each other with minimal relative variations of the relative carrier envelope offset frequencies. Alternatively optical referencing can be implemented to precisely measure repetition rate variations between the two combs. Such schemes were discussed for example in U.S. patent application Ser. No. 12/895,127 'Optical signal processing with modelocked lasers', to Fermann et al. and are not further explained here.

Thus, the inventors have disclosed an invention in which at least one embodiment includes a mode locked waveguide laser system, including, for example, a fiber laser. The waveguide laser includes a laser cavity having a waveguide. An intra-cavity beam is emitted from the waveguide. A dispersion control unit (DCU) is disposed in the cavity and in an optical path of the intra-cavity beam. The laser cavity is configured in such a way that an intra-cavity beam is redirected to the waveguide after traversing at least the DCU. The DCU imparts angular dispersion and group-velocity dispersion (GVD) to the intra-cavity beam during propagation in the cavity. The DCU also imparts a spatial chirp to the redirected beam. The DCU is capable of producing net GVD in a range from a positive value to a negative value.

A mode locked waveguide laser may include a mode locked fiber laser.

The DCU may include a diffraction grating and a lens system.

The DCU may include a lens system, and may include a prism or grism.

The DCU may include one or more of a diffraction grating, prism, grism, and angled waveguide endface, and may include one or more of an optical lens and mirror.

A means for control of the carrier envelope offset frequency of the laser may be included.

The means for carrier envelope offset frequency control may include an optical element and a mechanism for translating the optical element along an axis. In some embodiments a pressure and/or temperature control system for intra-cavity elements may be implemented with one or more feedback loops.

The mode locked waveguide laser may be configured as a soliton laser.

The mode locked waveguide laser may operate at a repetition rate greater than about 1 GHz.

The mode locked waveguide laser system may be configured to operate at dual wavelengths simultaneously, and the DCU may be configured to provide a wavelength separation of the dual wavelengths.

The waveguide laser may include a fiber laser, and may be configured to provide a different repetition rate for each of the two wavelengths.

The mode locked laser system may be configured for multi-heterodyne spectroscopy.

The mode locked waveguide laser may include a split mirror.

The mode locked waveguide laser system may include a spectral broadening stage.

The mode locked waveguide laser system may include a repetition rate multiplier.

The mode locked waveguide laser system may include: an optical modulator providing a pulse train with a mark/space ratio >2; at least one fiber amplifier; and one or more spectral broadening stages downstream from the mode locked waveguide laser.

The mode locked waveguide laser may be configured such that a temporal bandwidth of the mode locked waveguide laser is limited, at least in part, by the spatial chirp.

The DCU may be configured to displace at least one optical element of the DCU so as to adjust the net GVD to a value within the range.

At least one embodiment includes a tunable fiber frequency comb system configured as an optical frequency synthesizer. The tunable comb system includes a fiber comb laser and a comb controller to control the comb laser, and to provide tunable comb spacing. The system includes a single frequency laser, for example a quantum cascade laser, that generates an optical output at substantially a single optical frequency corresponding to a wavelength in the mid to far IR wavelength range. A frequency broadening stage receives an output of the fiber comb laser, and the frequency broadening stage may be configured to produce spectral overlap with an optical output spectrum of the quantum cascade laser. A comb line selector may be included to select and isolate at least one comb line from the fiber comb laser, the comb having a comb spacing greater than about 250 MHz. A feedback loop locks the output optical frequency of the quantum cascade laser to the selected comb line. The optical frequency of the quantum cascade laser becomes a function of the tunable comb spacing.

The comb line selector may include one or both of an RF filter and an optical filter.

The feedback loop may be configured to selectively adjust a temperature or operating current of the quantum cascade laser.

At least one embodiment includes a high resolution spectroscopy system. The system includes a fiber comb laser having a repetition rate greater than about 1 GHz. An optical sub-system may be disposed downstream from the fiber comb laser, and configured to optically resolve the individual comb lines from the comb system. The optical sub-system may include: at least one or both of a diffraction grating and a VIPA, and a one or two dimensional detector array. The individual elements of the detector array may be spaced in such a way that each element is sensitive to an optical frequency band approximately equal to the comb line spacing.

The high resolution spectroscopy system may include a fiber frequency comb system having tunable comb spacing, tunable carrier envelope offset frequency, or both.

The high resolution spectroscopy system may include: at least one reference laser and at least one detector configured for measuring the instantaneous optical frequencies of the comb system.

At least one embodiment includes a low phase noise micro-wave source. The system includes: a fiber comb laser with a comb spacing greater than about 1 GHz; a reference laser; a first detector to measure a first micro-wave beat signal (S1) between a line of the comb laser and the optical reference laser. The system also includes a sub-system to measure a carrier envelope offset frequency of the fiber comb laser, the sub-system receiving an output from the comb laser, and producing as an output signal (CEO) representative of the carrier envelope offset frequency. A mixer receives the first micro-wave beat signal and the output signal (CEO) and generates a second beat signal (S2). A comb controller controls the comb laser, for example the repetition rate and carrier phase. The comb controller also receives the second beat signal, and a portion of the comb controller is configured to phase lock the second beat signal to a micro-wave reference via modulation of the comb laser spacing. A second detector output provides a low phase noise micro-wave output signal.

Some embodiments of a mode locked waveguide laser system and/or a low phase noise micro-wave source may include additional electronic feedback circuit(s) configured to stabilize the comb laser output power.

Some embodiments of a mode locked waveguide laser system and/or a low phase noise micro-wave source may include a highly rare earth doped gain fiber.

In some embodiments a mode locked waveguide laser may be configured as a ring laser, or with a Fabry-Perot cavity.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A multi-GHz frequency comb based system, comprising:
   a mode locked waveguide laser configured such that individual comb modes output therefrom are separated by more than 1 GHz in frequency space;
   an amplitude modulator configured to modulate the amplitude of an output of said mode locked waveguide laser;
   a fiber amplifier disposed downstream from said amplitude modulator configured to amplify a modulated output produced with said amplitude modulator; and
   a highly nonlinear fiber optically coupled to said fiber amplifier and configured for frequency broadening of a signal generated by said multi-GHz comb based system.

2. The multi-GHz comb based system according to claim 1, further comprising an f-2f interferometer.

3. The multi-GHz comb based system according to claim 1 operably arranged for control of a carrier envelope offset frequency of said multi-GHz comb based system.

4. The multi-GHz comb based system according to claim 1, wherein said amplitude modulator comprises an electro-optic modulator.

5. The multi-GHz comb based system according to claim 1, comprising one or more nonlinear frequency broadening stages operably arranged for supercontinuum generation.

6. The multi-GHz comb based system according to claim 1, comprising one or more nonlinear frequency broadening stages operably arranged for difference frequency generation.

7. The multi-GHz comb based system according to claim 1, operably arranged to generate a microwave beat signal between a precision optical reference frequency and a signal from the mode locked waveguide laser for low phase noise micro-wave generation.

8. The multi-GHz comb based system according to claim 1, wherein said multi-GHz comb system comprises solid-state, semiconductor based or micro-ring resonators.

9. The multi-GHz comb based system according to claim 1, comprising an f-2f interferometer operably arranged for measuring a carrier envelope offset frequency of said multi-GHz comb based system.

* * * * *